H. Maycock,
Hay Elevator,

No. 52,808.          Patented Feb. 20, 1866.

Witnesses.          Inventor.

Henry Maycock
Munn & Co
Attorneys.

UNITED STATES PATENT OFFICE.

HENRY MAYCOCK, OF VERONA, NEW YORK.

IMPROVEMENT IN OPERATING HORSE HAY-FORKS.

Specification forming part of Letters Patent No. 52,808, dated February 20, 1866.

*To all whom it may concern:*

Be it known that I, HENRY MAYCOCK, of Verona, in the county of Oneida and State of New York, have invented a new and useful Improvement in Operating Horse Hay-Forks; and I do hereby declare that the following is a full, clear, and exact description thereof, which will enable others skilled in the art to make and use the same, reference being had to the accompanying drawings, forming part of this specification, in which—

Figure 1:
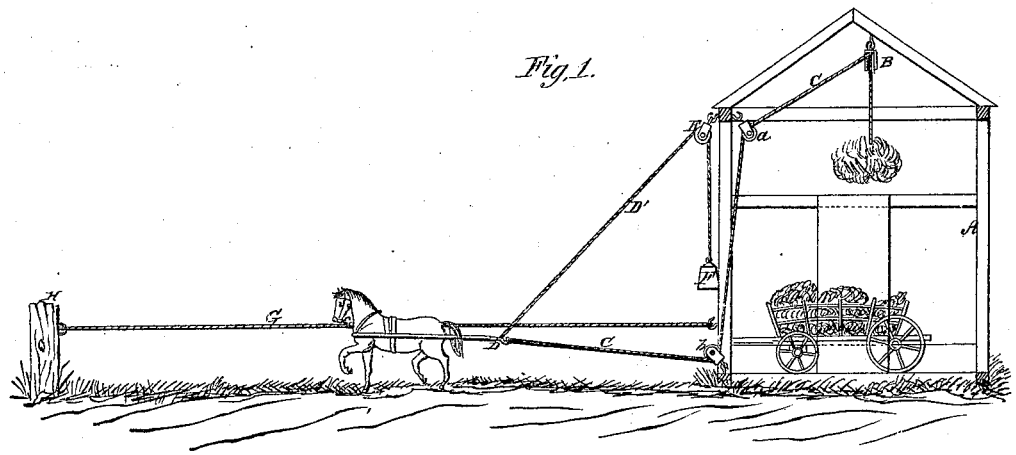
Figure 2:
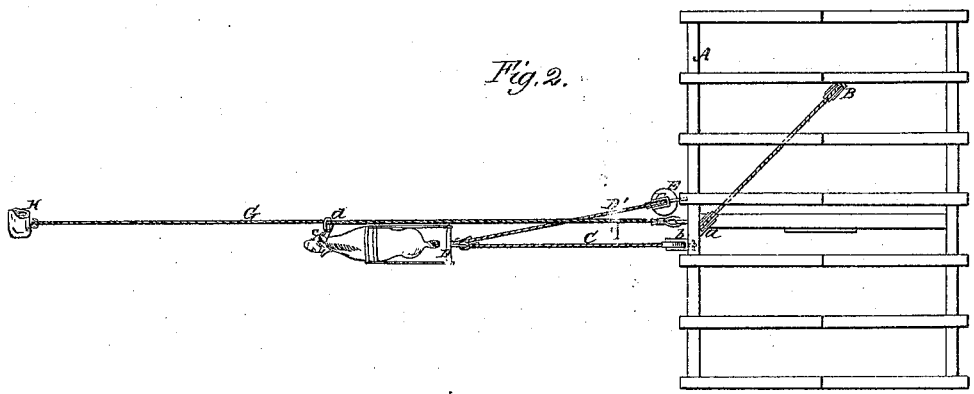

Figure 1 is a side elevation of my invention; Fig. 2, a plan or top view of the same.

Similar letters of reference indicate like parts.

This invention relates to a new and useful improvement in horse hay-forks, those devices which are used for elevating hay and storing it away in mows in barns.

The object of the invention is to economize in labor in operating the fork. Hitherto the horse by which the fork is operated has required a driver, and by my improvement the driver is dispensed with.

The invention consists in applying a weight to the hoisting-rope in such a manner that when the horse is backed in order to lower the fork the slack of the rope will be taken up by the weight and the whiffletree kept clear from the horse's heels. A guide-rope is also employed to keep the horse in line, or to cause it to walk in a proper direction in hoisting the fork, and also in backing to lower the same.

A represents the framing of a barn, having a pulley, B, in its upper part, over which the hoisting-rope C of the hay-fork passes, said rope also passing through a pulley-block, $a$, at the side of the barn and then down through a block, $b$, at the bottom of the barn, so that the horse may pull upon the rope and draw the lower part of it in a horizontal direction, as will be fully understood by referring to Fig. 1.

The horse is attached to the rope C by means of a whiffletree, D, as usual, and to the whiffletree a supplemental rope, D', is secured, said rope passing through a pulley-block, E, at the outer side of the barn at its upper part, and having a weight, F, at its end.

G represents a guide-rope, one end of which is attached to the outer side of the barn, and the opposite end secured to a post, H, sunk into the ground at a suitable distance from the barn, and at such a point that the rope G will be strained sufficiently taut and coincide with the direction the horse should travel in raising and lowering the fork, the length of the rope being sufficient to admit of the horse raising the fork to the desired height.

The bridle of the horse has a small rope, $c$, attached to it, with a ring, $d$, at its end, which ring is fitted on the rope, so as to slide freely thereon.

When the fork is lowered and fully down the horse will be nearly or quite up to the barn and the weight F down nearly or quite in contact with the ground. When the fork is loaded the horse is started simply by the word of the operator on the wagon or cart in the barn, and the horse starts off in the proper direction, the rope G serving as an efficient guide, and the fork is elevated, the weight E of the supplemental rope D' being elevated at the same time.

When the load of the elevated fork is dumped the horse is backed by word of mouth, the weight taking up the slack rope and keeping the whiffletree D free from the horse's heels. This weight F is extremely necessary, for but little dependence can be placed upon the gravity of the fork to take up the slack of rope C, as the fork in its descent is necessarily drawn at one side under the pull of the guy-rope in order to guide it over the edge of the mow and is therefore rendered nearly or quite sufficient so far as its action upon the rope C is concerned.

Thus by this simple arrangement a driver is dispensed with, and no trouble or difficulty will be experienced with any tractable draft-horse.

The device may be applied at a trifling expense.

Having thus described my invention, I claim as new and desire to secure by Letters Patent—

1. The arrangement of the guard-rope D', weight F, pulley E, and whiffletree D, constructed and operating in the manner and for the purpose herein specified.

2. In combination with the above, the arrangement of the guide-rope G, ring $d$, and rope C, constructed and operating in the manner and for the purpose herein specified.

The above specification of my invention signed by me this 2d day of November, 1865.

HENRY MAYCOCK.

Witnesses:
  M. M. LIVINGSTON,
  C. L. TOPLIFF.